United States Patent [19]

Lapeyre

[11] Patent Number: 4,693,861

[45] Date of Patent: Sep. 15, 1987

[54] MOLD AND PROCESS FOR MANUFACTURING HELICAL SHAPED ITEMS

[75] Inventor: James M. Lapeyre, New Orleans, La.

[73] Assignee: The Laitram Corporation, Harahan, La.

[21] Appl. No.: 598,374

[22] Filed: Apr. 9, 1984

[51] Int. Cl.⁴ .............................................. B29C 45/36
[52] U.S. Cl. .................................. 264/328.1; 249/59;
 249/101; 249/144; 249/184; 264/334; 425/542
[58] Field of Search .................. 249/59, 100, 101, 144,
 249/160, 184; 425/542, DIG. 58; 264/328.1,
 328.14, 334; 198/664, 666

[56] References Cited

U.S. PATENT DOCUMENTS

| | | | |
|---|---|---|---|
| 349,233 | 9/1886 | Nelson | 198/664 |
| 375,931 | 1/1888 | Gunckel | 198/664 |
| 455,384 | 7/1891 | Birkholz | 198/666 |
| 525,194 | 8/1894 | Dyson et al. | 198/666 |
| 546,879 | 9/1895 | Dyson et al. | 249/59 |
| 1,090,956 | 3/1914 | Zinteck | 198/664 |
| 1,867,573 | 7/1932 | Leach | 198/664 |
| 2,133,019 | 10/1938 | Campbell | 249/59 |
| 2,492,915 | 12/1949 | Carlson | 198/666 |
| 2,864,128 | 12/1958 | Heisler et al. | 249/59 |
| 3,461,949 | 8/1969 | Nilson | 249/59 |
| 3,584,092 | 6/1971 | Alexandris | 249/59 |
| 3,648,826 | 3/1972 | Brooks | 198/664 |
| 3,664,212 | 5/1972 | Hehl | 249/59 |
| 3,705,644 | 12/1972 | Kawchitch | 198/664 |
| 3,891,367 | 6/1975 | Signora | 425/443 |
| 3,905,416 | 9/1975 | Hammer | 249/59 |
| 3,926,401 | 12/1975 | Northup | 249/59 |
| 4,059,249 | 11/1977 | Galer | 249/59 |
| 4,079,475 | 3/1978 | Thompson | 425/441 |
| 4,107,257 | 8/1978 | Swin, Sr. | 264/275 |
| 4,139,176 | 2/1979 | Wündsch | 249/59 |
| 4,188,178 | 2/1980 | Anscher | 249/59 |
| 4,243,199 | 1/1981 | Hill | 425/DIG. 58 |

Primary Examiner—Jay H. Woo
Assistant Examiner—James C. Housel
Attorney, Agent, or Firm—J. C. Kesterson

[57] ABSTRACT

A mold and process for integrally forming a modular helical shaped device such as a screw conveyor is disclosed. The mold has a center operating axis (26) and includes a first section (20A) which forms a portion of the axial member (33). The first section (20A) also forms one of the helical surfaces (36A) disposed around the center axis (26) which has an amount of rotation no greater than 360 degrees. In a similar manner, a second section (20B) is adapted for reciprocating movement along the center axis (26) between an open and closed position with respect to section (20A). The second section (20B) forms the other one of the helical shaped flight members (41). Thus, the two mold sections define a substantially enclosed cavity having an elongated axial portion and a helical shaped flight portion with a selected cross-section that forms the helical shaped device. In a preferred embodiment, there is also included a center rod member (62) which is coaxial with the axial cavity (34A) and operates so that when withdrawn from the cavity it provides an aperture in the resulting axial member (33) of the helical shaped device. In addition, the mold and technique may be used to form helical shaped devices having more than one flight member so long as each flight member does not overlap another flight member.

32 Claims, 30 Drawing Figures

MOLD AND PROCESS FOR MANUFACTURING HELICAL SHAPED ITEMS

TECHNICAL FIELD

This invention relates to a mold and a process for the production and fabrication of helical shaped devices such as screw conveyors, and more particularly to a two-piece mold for forming sections of such a screw conveyor, which opens by relative movement of one piece with respect to the other along a predetermined axis. The mold and the process as described herein, results in an integrally formed helical shaped device or screw conveyor which is preferably molded of a material such as plastics, rubber and the like. The helical shaped device produced by the mold and process of this invention includes an axial member having a center axis, wherein rotation of the helical shaped device or screw conveyor takes place around the center axis. For each section so molded the axial member is integrally molded with one or more helical shaped flight members which enclose substantially, but no more than, 360 degrees of the center axis. A screw conveyor of any desired length can be fabricated by axially joining the necessary number of sections of modules.

BACKGROUND ART

As will be appreciated by those skilled in the art, helical shaped devices include such items as the common screw and the like. In addition, specialized helical shaped devices such as screw conveyors are well known for the transport of various types of bulk material. Such conveyors generally include a helical shaped member which rotates within a housing or trough such that rotation of the screw conveyor along its longitudinal or central axis results in movement of the bulk material along the length of the device. In the past, such conveyors were typically constructed from metal, and each conveyor was specifically designed for a particular purpose and of the necessary length. However, although most prior art conveyors were specifically designed to meet a particular application, there have been some attempts at providing a modular type conveyor of metal and wood. Examples of U.S. patents which disclose such modular conveyors include U.S. Pat. No. 349,233 issused to James Nelson on Sept. 10, 1886; U.S. Pat. No. 455,384 issued to H. Binkholz on July 17, 1891; U.S. Pat. No. 525,194 issued to J. Dyson, et al on Aug. 20, 1894; U.S. Pat. No. 546,879 issued to J. Dyson et al on Sept. 24, 1895, U.S. Pat. No. 1,867,573 issued to V. G. Leach on July 19, 1932; U.S. Pat. No. 2,492,915 issued to A. B. Carlson on Dec. 27, 1949; and U.S. Pat. No. 3,648,826 issued to Dean P. Brooks on Mar. 14, 1972. However, a study of the above patents indicates that perhaps only the two Dyson, et al patents and the Nelson patent can be considered sectional or modular. Consequently, the inventor of the invention covered by the present application filed an application for a United States letters patent on Sept. 29, 1983 for a "Modular Screw Conveyor" and which has Ser. No. 537,345.

To date, the applicant is not aware of any type of helical shaped screw conveyor formed by molding, since the molds for such devices have in the past been considered expensive complex and difficult to operate. Further, until this invention, helical modules having a one-piece hollow axial shaft as an integral part of its molded product were thought to be unmoldable in a simple two piece mold without side actions. For example, U.S. Pat. No. 3,891,367 issued to Maurizio Signora on June 24, 1975 discloses a process for forming helical gears from a metal powder by compression. According to this patent, a portion of the die or mold for forming the helical gear is required to undergo helical motion as it moves axially to open and close the mold. Absent such rotating or helical motion, the formed material would prevent axial opening of the two pieces of the die or mold. It will be appreciated of course that a requirement of helical motion by a portion of the die greatly increases the complexity and cost of the molding process. Other molds in prior use for molding helical shaped devices include side opening molds. That is, molds which open perpendicularly to the axial center of the helical shaped mold rather than parallel or along the axial center. However, because of the helical shape of the flight member it is necessary that a flight member formed by such side opening molds be molded with a substantially broader base than tip if the mold is to open at all. Consequently, although a side opening mold may be suitable for certain screw type fastening devices it is completely unacceptable for efficient screw type or helical shaped conveying system, since such conveying systems preferably have a flight members wherein the base is not substantially greater than the tip.

Attempts to mold other plastic devices such as single threaded nuts or wing-nuts, have resulted in molds which include portions which do move axial with respect to each other without rotational movement. For example U.S. Pat. No. 4,079,475 issued to Thompson on Mar. 21, 1978 discloses a mold for forming a fastening nut with a single internal thread of less than 360 degrees wherein the mold does open along the axial center of the mold without concurrent rotation. In a similar manner, U.S. Pat. No. 4,188,178 issued to Bernard Anscher on Feb. 12, 1980 discloses a mold for forming wing-nuts having a single internal thread and which requires the use of two forming steels for forming the tabs of the wing-nut and two piston portions which move axially with respect to each other for forming the internal portion of the wing-nut and the single full thread. However, an examination of these patent reveal that the molds are much more complex, and the resulting product has internal threads rather than an external thread. Furthermore, both the Auscher and Thompson patents require a four piece mold for operation.

From initial appearances, perhaps U.S. Pat. No. 546,879 as listed above would seem to show a casting mold which opens along its center axis for forming metal screw or helical shaped surfaces. However, a reading of the patent and study of the drawings clearly illustrates that it does require an initial rotation of one of the portions of the mold with respect to the other if the mold is to be separated along the center axis. Therefore of course, if the center portion of the mold which forms the axial member of the casting was not of a circular outside shape, such rotation would be impossible. In the Dyson, et al, patent however, such rotation is possible since the mold does not form an axial or center member at all, and only forms the helical portion or the flight members.

Other patents which illustrate the present state of the art for molding helical shaped or screw devices, include U.S. Pat. No. 3,461,949 issued to N.E.R. Nilson on Aug. 19, 1969; U.S. Pat. No. 3,664,212 issued to Hehl on May 23, 1972; U.S. Pat. No. 2,864,128 issued to Heisler et al on Dec. 16, 1958; U.S. Pat. No. 3,584,092 issued to Alexander on June 8, 1971; U.S. Pat. No. 3,905,416 issued to Hammer on Sept. 16, 1975 U.S. Pat. No. 4,059,249 issued to Galer on Nov. 22, 1977; and U.S. Pat. No. 4,139,176 issued to Wundsch on Feb. 13, 1979.

Thus a review of the prior art patents reveals that to date there has not been a simple and inexpensive mold and process for forming a helical shaped device having an axial member and certainly not such a mold and process suitable for injection molding, and most certainly not one having an axial member with a non-circular aperture molded therein. Therefore, it is an object of this invention to provide a two-piece mold and related molding process for forming, by injection molding, a helical shaped device which includes an axial member integrally joined with a helical shaped flight member.

It is another object of the present invention to provide a mold and process for forming helical shaped flight members integrally formed with an axial member which defines a non-circular aperture therethrough.

It is also an object of the present invention to provide a mold and molding process for forming a helical shaped device wherein the flight member extends radially from, and around an axial member and encloses up to 360 degrees.

It is still a further object of the present invention to provide a mold and molding process for forming a helical shaped device which may be joined axially with similar helical shaped devices for forming a screw conveyor of any desired length wherein the flight member extends around the axial member greater than 360 degree.

Other objects and advantages will be obvious, and will in part appear hereinafter, and will be accomplished by the present invention which provides a reusable mold and molding process for integrally forming a helical shaped device from a selected material. The formed helical shaped device includes an axial member integrally joined with one or more helical shaped flight member each of which has front and back surfaces. The flight member or members extend a selected distance radially from the axial member and in combination enclose up to 360 degrees coaxially around the axial member. The reusable mold operates or opens along a center axis and comprises a first section which partially defines an elongated cavity portion which extends along and around the center axis. This first section forms a portion of the axial member of the helical shaped device. The section further defines a helical surface which is also disposed coaxially around and along the center axis and extends the selected distance radially from the axis and for the selected amount of rotation of no greater than 360 degrees. This first section forms one of the front and back surfaces of the helical shaped flight member. A second section similar to the first section, which is adapted for reciprocating movement along the center axis between an open and close position with respect to the first section also defines an elongated cavity portion which extends along the center axis. The second section of the mold also includes a helical surface similar to that of the first section which is disposed coaxially around and along the center axis. This second helical surface also extends radially from the axis for the same distance and for the amount of rotation as the helical surface on the first section such that it forms the other surface of the helical shaped flight member. The two sections of the mold cooperate such that when they are in a closed position, the helical surfaces of each section are substantially parallel to each other and are maintained at a selected and constant spacing so that in combination, the sections define a substantially enclosed cavity having an elongated axial portion and a helical shaped flight portion of a selected cross-section which extends radially from the center axis and is with the center axis for the selected amount of rotation.

In addition, at least one of the first and second sections define a sprue, gate or port which extends from the enclosed cavity to the outside of the mold such that molding material may be transferred to the inside of the mold to fill the cavity and integrally form the helical shaped flight member and axial member. In operation, the two sections open and close by axial movement with respect to each other such that the helical shaped device formed in the cavity may be removed by moving at least one of the sections along the center axis to the open position.

In a preferred embodiment, the mold further encloses a central rod member which is positioned coaxially, with the center axis and has a selected cross-section which is smaller than the cross-section of the elongated cavity in the mold. Typically, the central rod member extends the length of the elongated cavity such that when the molded item is removed from the mold, an aperture extends coaxially completely through, and coaxially with the axial shaped member. However, for some processes, such as metal castings for example, it may be desirable that an aperture extend only partway through the axial member. In such cases the central rod member will not extend the full length of the elongated cavity.

Also in the preferred embodiment, the defined aperture through the axial shaped member is non-circular and may preferably be square or hexagonal in shape.

The present mold and molding technique may also be used to form a helical shaped device which includes more than a single flight member. In the event more than one flight member is to be formed along and coaxial with the center axis, each of the helical shaped flight members will enclose a selected amount of the center axis for a number of degrees determined by dividing the selected number of flight members into 360 degress. Further, each of such flight members will be located in a rotational position which is different from every other one of the flight members, such that none of the flight members overlap. For example it will be appreciated that if two flight members are used, each of the flight members will enclose substantially 180 degrees. Similarly, if three flight members are used each of the flight members will enclose substantially 120 degrees of the axial member.

It should also be understood that a multiplicity of the devices formed by the molding process of this invention may be axially joined to produce an elongated screw conveyor or helical shaped device of any desired or selected length which has at least one continuous helical flight member which extends around the center axis greater than 360 degrees.

BRIEF DESCRIPTION OF THE DRAWINGS

The above features of the present invention will be more clearly understood from consideration of the following description in connection with the accompanying drawings in which.

BEST MODE FOR CARRYING OUT THE INVENTION

Figures 1A, 1B:
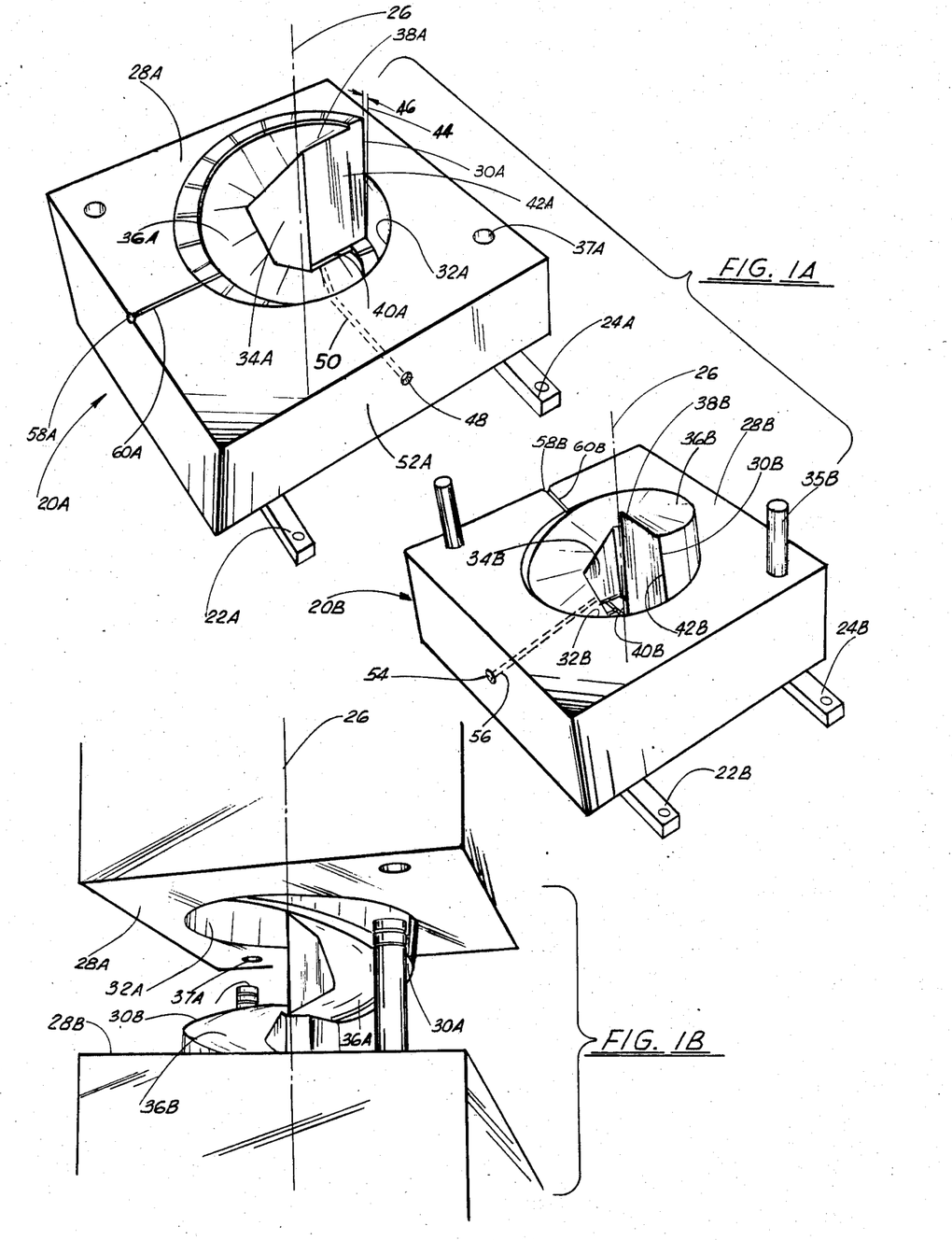
FIGS. 1A and 1B show a preferred embodiment of a simple two-piece mold for forming a single helical flight member around a square shaped axial member wherein the mold is opened by reciprocating movement along the center axis.
Figure 2:
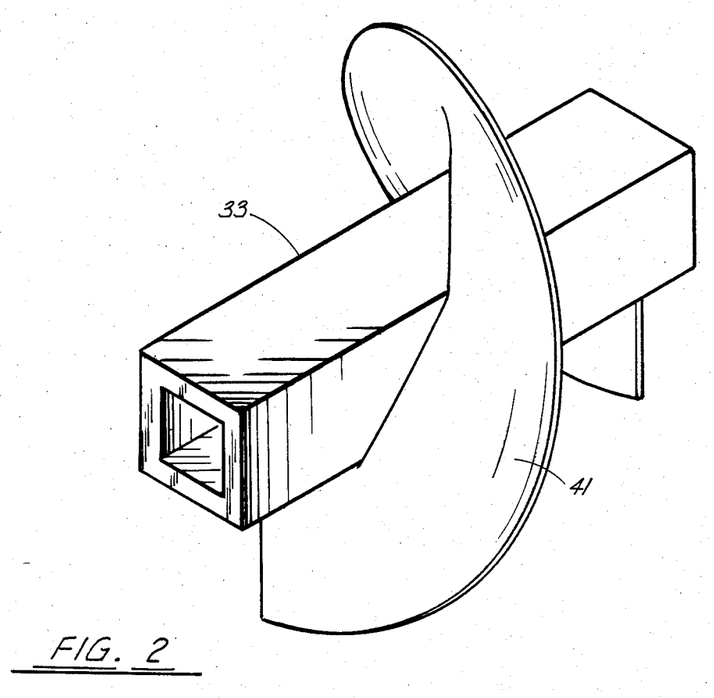
FIG. 2 shows a section or module of a screw conveyor formed in the mold of FIG. 1.

Referring now to FIGS. 1A and 1B, there are shown perspective views of a two-piece mold which includes features of this invention, and which is suitable for forming a helical shaped device such as the individual modules or sections of a modular screw conveyor shown in FIG. 2. As shown, the mold includes a first section 20A and second section 20B. Except for optional variations to be discussed hereinafter, both of the two pieces of the mold may be identical and consequently will carry the same reference numbers. Of course, if the halves are identical then the halves would be interchangeable. However, the reference numbers for one half will carry the additional letter reference "A" and reference numbers for the other half will carry the additional letter reference "B". As shown the two sections 20A and 20B of the mold will typically be made of two similar blocks of steel or aluminum. Although the technique of mounting the two sections of the mold to the molding machine itself may vary depending upon the type of molding machine being used, there will typically be one or more attaching members or supporting bars such as bars 22A and 24A attached to section 20A and 22B and 24B attached to section 20B by which the two mold halves are attached to the machine. Although modern molding machines may be capable of various types of movements in the opening and closing steps, it will be appreciated that a simple reciprocating or axial movement is faster, requires less maintenance and is certainly preferred.

Consequently, according to the present invention, there is also shown a center axis 26 which extends through the two mold halves 20A and 20B along and parallel to which the mold halves move for opening and closing. Each of the mold halves 20A and 20B also include matching surfaces 28A and 28B which matching surfaces are coplanar when the mold is in the closed position. Also as shown each of the mold halves include a piston or projecting portion 30A and 30B and a recess or cavity portion 32A and 32B. It can readily be seen that the piston or projecting portion 30A of block 20A must enter cavity portion 32B of block 20B while at the same time piston portion 30B of block 20B must enter cavity portion 32A of block 20A. Consequently it will be appreciated by those skilled in the art that the surfaces of piston and cavity portions 30A and 32A respectively are machined to fit together and cooperate with minimum clearance with the piston and cavity portions of 30B and 32B. Also as can more readily be seen in mold section 20A there is included in each section 20A and 20B a partial elongated aperture 34A and 34B respectively which is defined both by the piston portions 30A and 30B, and the cavity portions 32A and 32B of each mold block. These apertures, 34A and 34B, form the axial member 33 of the helical shaped conveyor section shown in FIG. 2. Also, as will be appreciated by those skilled in the art, one or more guide pins, such as guide pin 35B on section 20B cooperates with receiving aperture 37A on section 20A.

As will be discussed hereinafter, aperture 34A extends along the center axis, and according to a preferred embodiment, has a square cross-section when taken perpendicular to the axial member of the helical shaped device. In addition to this square shaped axial cavity, it can also be seen that mold half 20A defines a helical shaped surface 36A which extends from a first or exterior edge 38A around the center axis 26 in a helical shaped manner to a second or interior point 40A. As will be appreciated, helical surface 36A forms one of the front and back surfaces of a flight member 41 of the resulting helical shaped device of FIG. 2. In a similar manner, mold half 20B also defines a cooperating helical shaped surface 36B extending from exterior edge 38B to interior point 40B, which forms the other one of the back or front surfaces of the resulting helical shaped device. Furthermore it can be seen that when the two mold halves 20A and 20B are moved to the closed position, the two helical shaped surfaces 36A and 36B are substantially parallel to each other and are maintained at a selected spacing such that when filled with a selected molded material they will form the flight member 41 itself of the helical shaped device. Furthermore when the two mold halves 20A and 20B are moved axial with respect to each other, it will also be appreciated that the flat and substantially radial surfaces 42A and 42B must slide past each other during opening and closing of the mold. Therefore, to avoid rubbing contact and excessive wear of the mold halves, it can be seen that according to a preferred embodiment these surfaces are machined at an angle of approximately 1 degree, as shown by arcuate arrow 46 with respect to a plane represented by line 44 which is parallel to the center axis 26 and such that during operation they are never in contact except when the mold is fully closed. That is, when the mold starts opening they move apart and thereby avoid friction or rubbing. Likewise, when closing, the mold surfaces 42A and 42B do not make contact until the mold is in the completely closed position.

As will also be appreciated by those skilled in the art, injection molding requires some way for the selected material to be moved from outside the mold to the interior cavity of the mold where the item is to be formed. To accomplish this there is shown a gate, port or sprue 48 having a passageway 50 defined in mold half 20A which extends from the top surface 52A of mold half 20A to the interior of the mold where the passageway 50 joins with the square cavity 34A. Thus, the selected hot liquid or molding material may be injected from the outside of the mold to completely fill the interior cavity formed by the two halves of the mold when they are in the closed position. Although the gate 48 and passageway 50 are shown as being totally in mold half 20A, it will be appreciated that a similar gate 54 and passageway 56 could also be included in mold half 20B such that the molding material may be injected from two points. Likewise it will be appreciated that a gate or port 58 may be formed by the two halves of the mold such that each mold half forms one half of the port or gate 58A and 58B, and passageway 60A and 60B. To those skilled in the art, it will be appreciated that either a single one of the ports or gates, or alternately all, may be used in a particular mold depending upon the requirements of the mold, such as size, the cooling available, and the type of materials used.

Figure 3A:
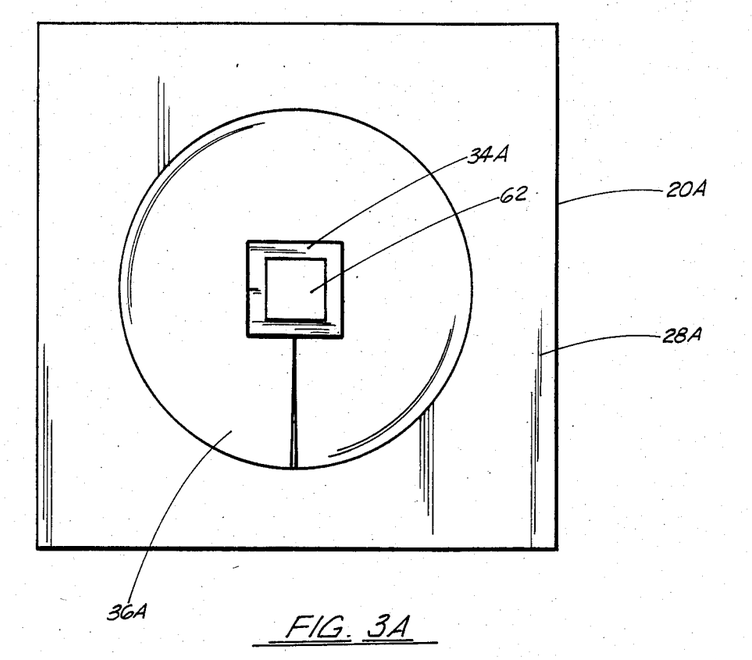
FIGS. 3A and 3B show top and side views of the perspective view of FIG. 1 and further show a central rod member for forming an aperture through the square shaped axial member.
Figure 3B:
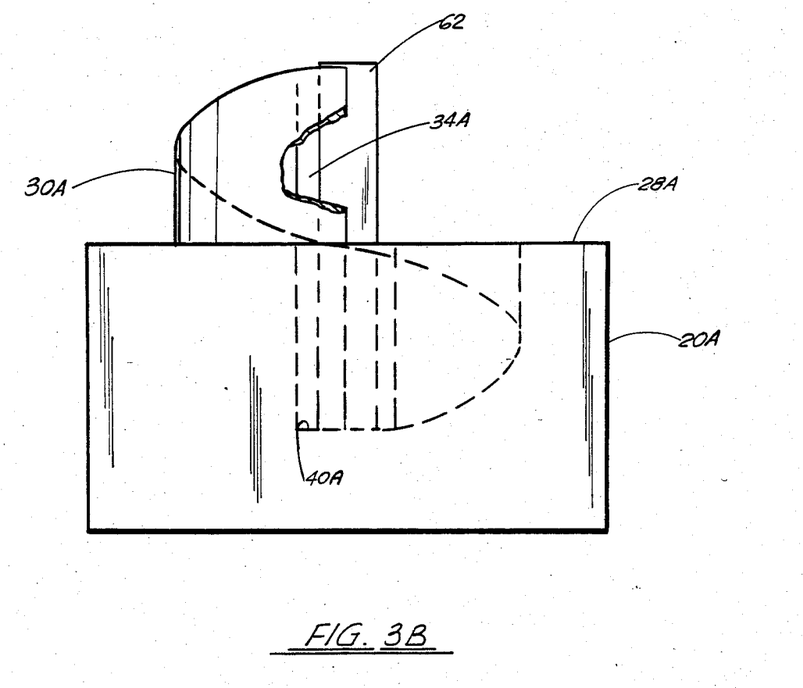
Figure 3C:
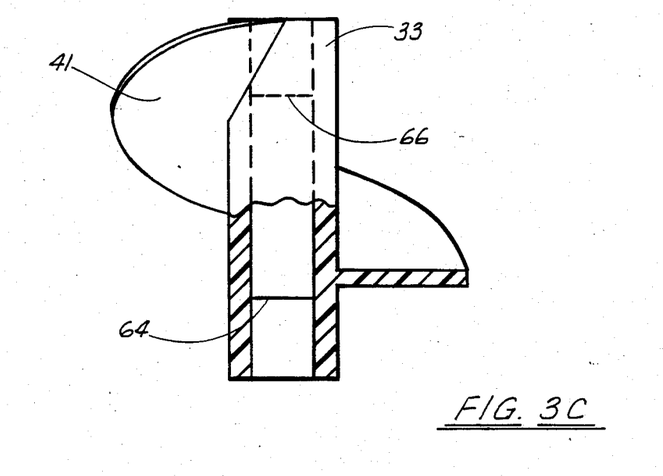
FIG. 3C shows a module, partially in cross-section formed in the mold of FIGS. 3A and 3B.

Referring now to FIGS. 3A and 3B, there is shown an end and side view respectively of the mold shown in the perspective view of FIG. 1. Elements of FIGS. 3A and 3B and the remaining Figures which are the same as those already described with Figures previously discussed may carry common reference numbers. As shown, the square shaped cavity or aperture 34A which forms the axial member of the resulting molded device, further includes a central rod member 62 which has a selected cross-section similar to the square aperture 34A but, of course, is smaller. In a preferred embodiment, this central rod member 62 extends the full length of the elongated cavity such that when removed from the mold the resulting axial member 33 of the device defines an aperture extending completely through and coaxially with the axial member 33. Although in a preferred embodiment, the center rod member 62 may be one piece which extends the full length from the interior point or base 40A of mold half 20A to the interior point or base 40B of mold half 20B, it will also be appreciated that rod member 62 may be in two pieces such that a portion extends from each of the bases or interior points 40A and 40B towards the other mold half to an intermediate point. Further, and as is shown with respect to other figures discussed hereinafter, the center aperture may be selected to have a shape other than square. Of course to obtain a particular shape, the cross-section of the center rod member 62 must be a matching shape. As shown in other figures, the central rod member 62 may be hexagon, oval, or any other desired non-circular shape. In addition, it may be desirable for certain applications that the aperture in the axial member 33 not extend completely through as illustrated by dashed line 64 and 66 in FIG. 3C. This is especially true with respect to parts or devices formed by a mold of this invention, for which the selected material is metal. In such applications, the central rod 62 may extend from the interior point or base 40A and 40B of each mold half for only a short distance. FIG. 3C shows a cross-section of a part so formed.

Figure 4:
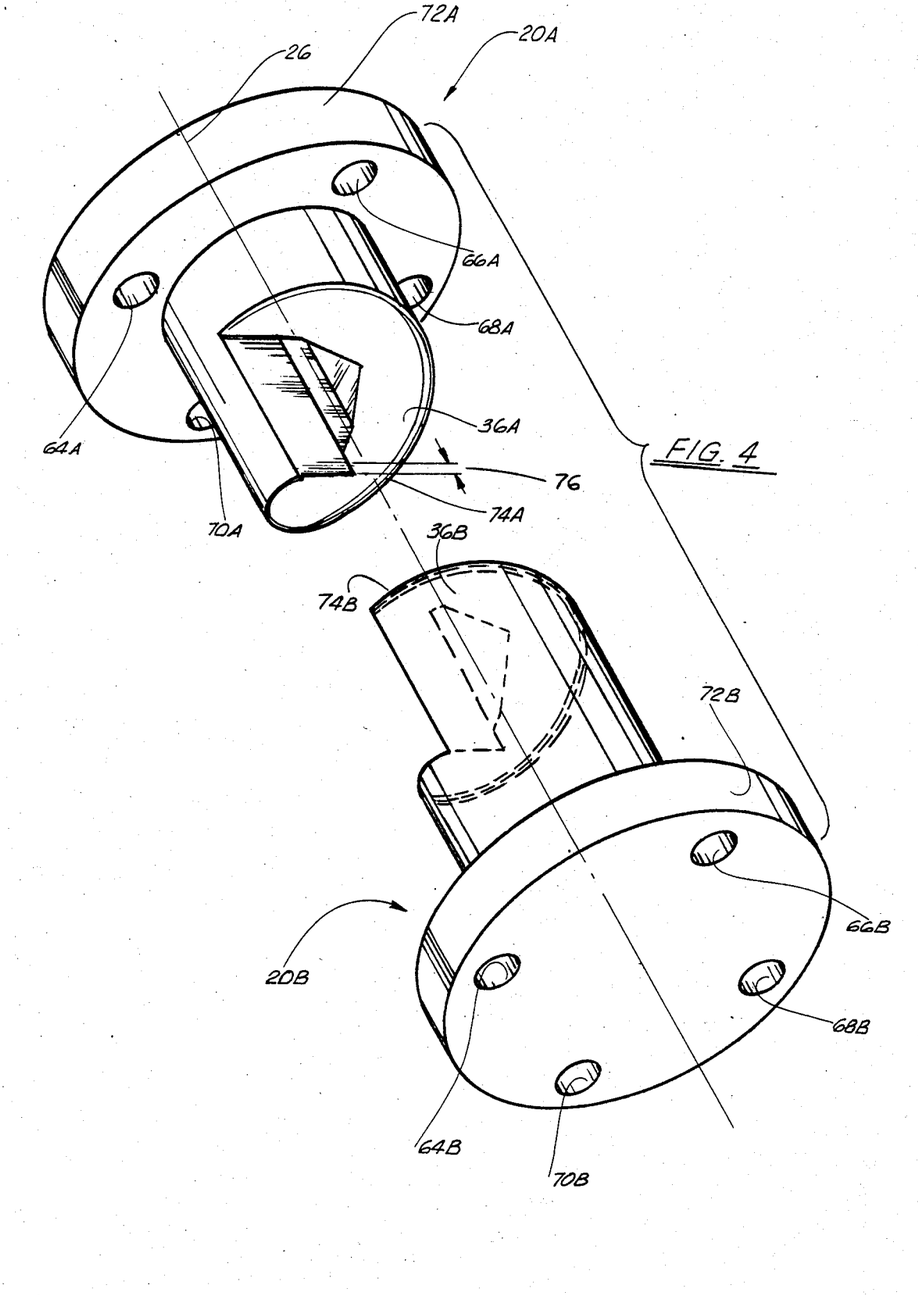
FIG. 4 shows an alternate embodiment of a simple two piece mold of the type shown in FIG. 1 for producing helical shapes.

Although a mold is typically cut or machined so that its exterior shape is substantially box shape it will be appreciated that the mold halves could each be substantially cylindrical shaped with an overall diameter larger than the desired diameter of the resulting molded object. As is shown in FIG. 4 two such mold halves may include mounting holes 64A and 64B, 66A and 66B, 68A and 68B and 70A and 70B in flanges 72A and 72B. Thus, except for the external shape of the mold halves themselves, the mold of FIG. 4 is substantially the same as the mold of FIG. 1, and of course modules formed in a mold similar to that shown in FIG. 4 would be the same as the module shown in FIG. 2 and formed in the mold shown in FIGS. 1 and 3. For purposes of understanding and discussing another feature of this invention, FIG. 4 may be preferable for disclosing and showing a preferred technique for forming or controlling the thickness of the flight members 41 of the molded item shown in FIG. 2. As can better be seen in FIG. 4, the parting surface 74A which joins or fully contacts surface 74B to prevent the escape of the injected material, is not coplanar with the flight surface 36A. That is, the thickness of the flight member itself may be determined by the distance between the parting surface 74A and the flight surface 36A as is represented by the double arrow labeled with reference numeral 76. Typically, the distance represented by reference numeral 76 will represent the total thickness of the flight member 41 when the surface 36B of mold half 20B is coplanar with the parting surface 74B. However, it will also be appreciated by those skilled in the art that just as the surface 36A is displaced from surface 74A to form the helical portion of the cavity, it is possible that in a similar manner the surface 36B of mold half 20B may also be displaced a selected distance from its separating surface 74B. In such an event, of course, it will be appreciated that the thickness of the resulting flight member 41 will be the total of the distances between the helical surfaces 36A and 36B, and the parting surfaces 74A and 74B of the two molds. In all other respects, the mold of FIG. 4 will work the same as the mold of FIG. 1 and is also mounted to open and close by movement along the center axis 26.

Figure 5:
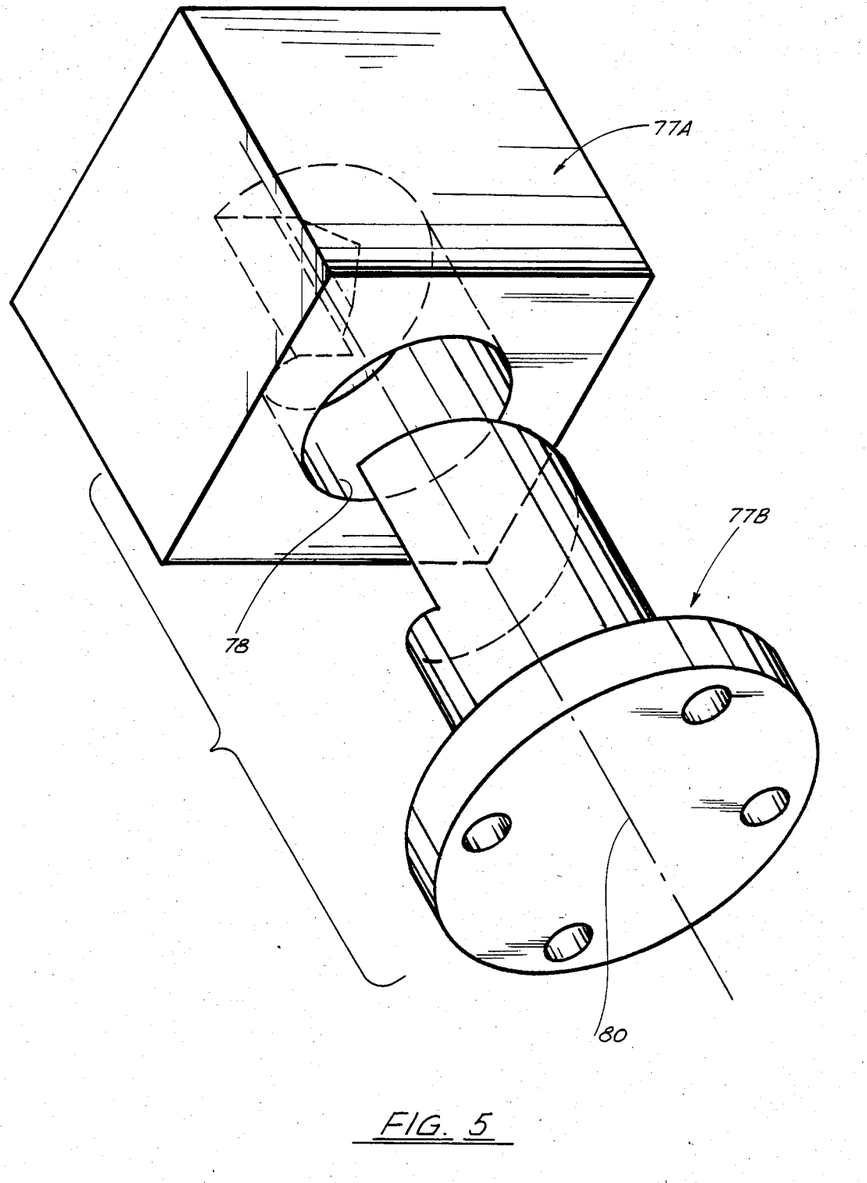
FIG. 5 shows another alternate embodiment of a two piece mold for producing helical shapes, wherein one of the two pieces of the mold is substantially cylindrical shaped and the other is a cooperating piston.

FIG. 5 shows still another mold arrangement wherein one half of the mold 77A consist of a block of metal having a box-like exterior with a cavity 78 cut therein of the desired shape including the helical surface area and the axial cavity as discussed above with respect to FIG. 1. The other half 77B of the mold is a plunger or piston which fits entirely within the cavity 78 of mold half 76A, this type mold operates the same as the molds of FIGS. 1 and 4 but, may provide increased sealing ability to prevent flashing of the material and over-stressing or warping of the mold halves. Of course, opening and closing of the two sections is also along the selected axis 80. In addition, it is believed that the thickness of the flight member 41 may be more readily varied with this type mold by simply controlling the depth piston half 77B is inserted into cavity 77A.

Figure 6:
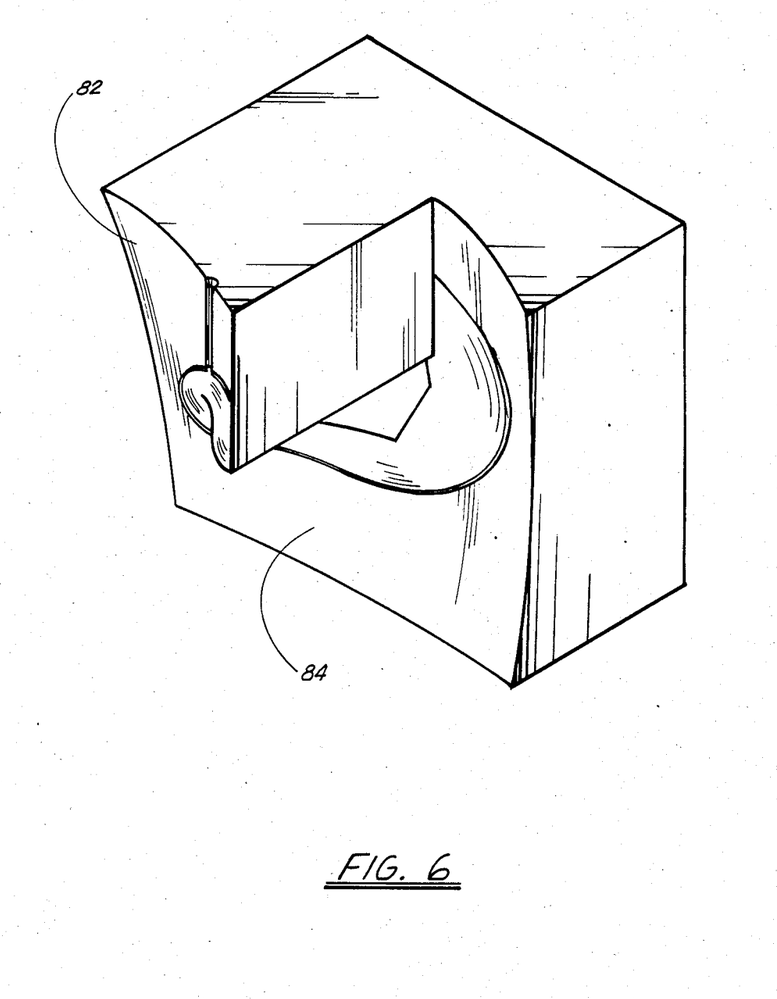
FIG. 6 shows still another alternate mold embodiment formed from rectangular shaped stock, and wherein the parting line of the two pieces of the mold follows a convoluted path.

FIG. 6 shows a half 82 of still another embodiment similar to that of FIGS. 1, 4 and 5, except the mold halves which are formed of two pieces of metal, having a box-like exterior shape having parting surface 84 which is convoluted to follow the helical shaped surfaces.

Figure 7:
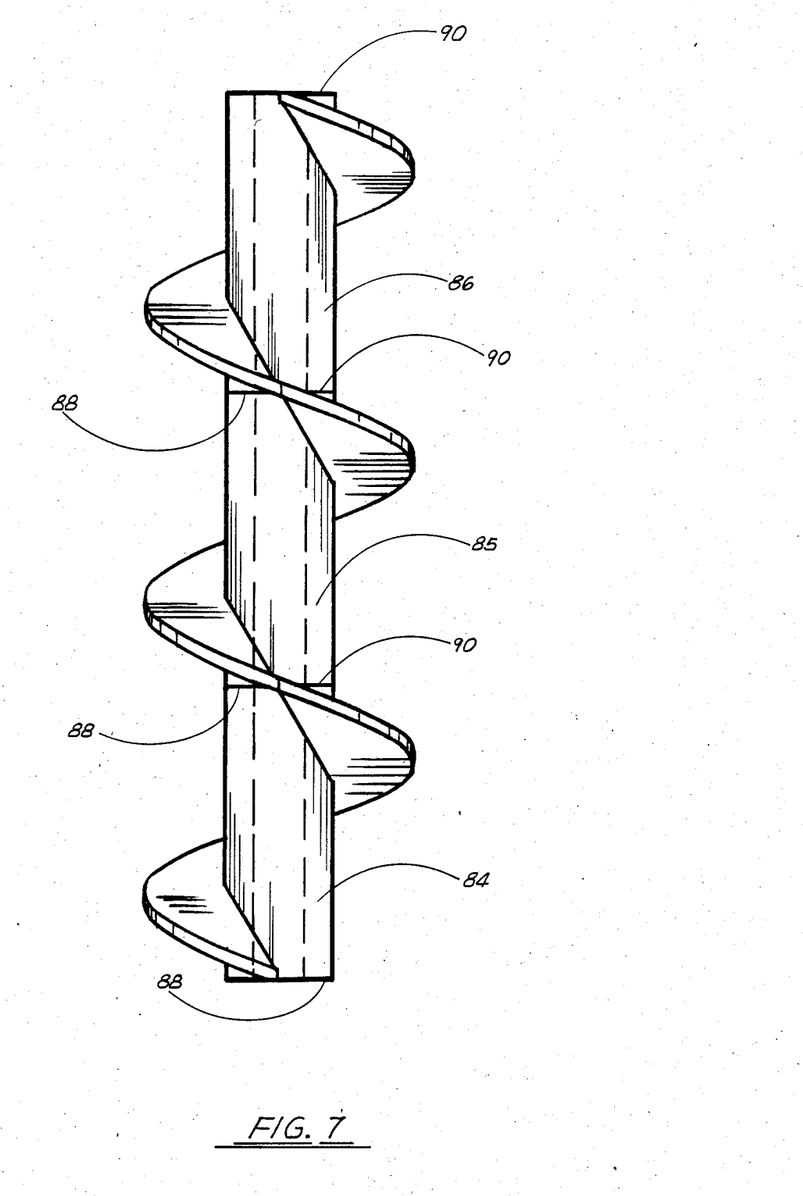
FIG. 7 shows three modules formed by one of the molds illustrated in FIG. 1 through FIG. 6 joined axially to produce a screw conveyor having a flight of over 360 degrees.

FIG. 7 shows how two or more single screw conveyor sections of the sections shown in FIG. 2, such as modules 84, 85 and 86 formed by any of the molds shown in FIG. 1 through 6 and incorporating the features of this invention may be axially joined to form a screw conveyor of any desired length. It will be appreciated, that each of the sections include a first axial end 88, and a second axial end 90 which are capatible and may be joined one to another to achieve the desired length screw conveyor.

Figure 8A:
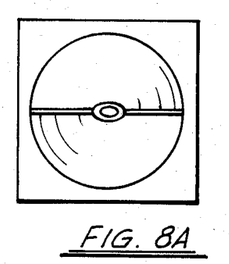
FIGS. 8A and 8B are end and side views respectively of a mold for forming two flight members of 180 degrees each.
Figures 8B, 8C:
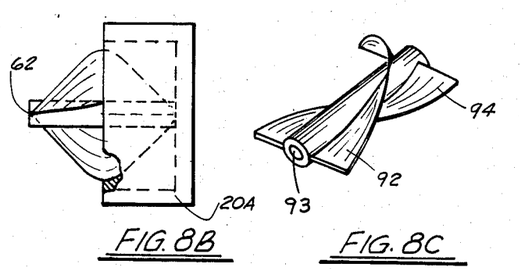
FIG. 8C shows the conveyor section formed by the mold of FIG. 8A and 8B.
Figure 9A:
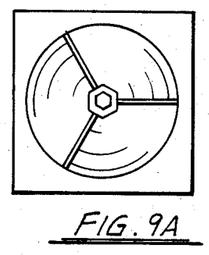
FIGS. 9A and 9B are end and side views respectively of a typical mold according to the teachings of this invention for forming three flight members of 120 degrees each.
Figure 9B:
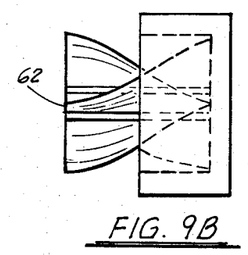
Figure 9C:
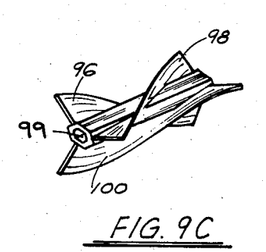
FIG. 9C shows the conveyor section formed by the mold of FIGS. 9A and 9B.
Figure 10A:
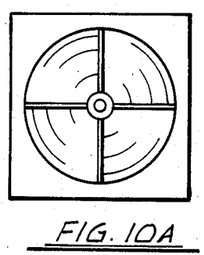
FIGS. 10A and 10B are end and side views respectively of a typical mold according to the teachings of this invention for forming four flight members of 98 degrees each.
Figure 10B:
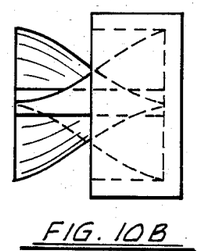
Figure 10C:
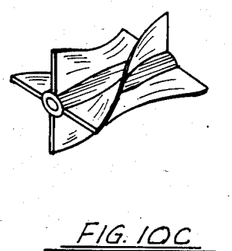
FIG. 10C shows the conveyor section formed by the mold of FIGS. 10A and 10B.
Figure 11A:
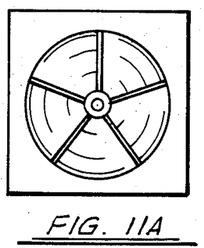
FIGS. 11A and 11B are end and side views respectively of a mold according to the teachings of this invention for forming five flight members of 72 degrees each.
Figure 11B:
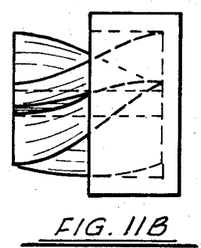
Figure 11C:
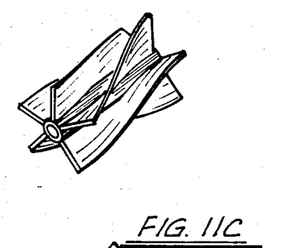
FIG. 11C shows the conveyor section formed by the mold of FIGS. 11A and 11B.
Figure 12A:
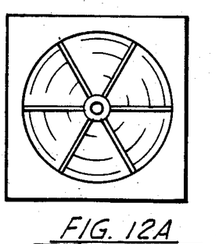
FIGS. 12A and 12B are end and side views respectively of a mold according to the teachings of this invention for forming six flight members of 60 degrees each.
Figure 12B:
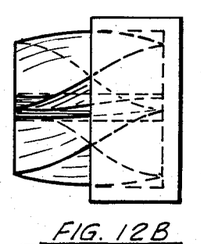
Figure 12C:
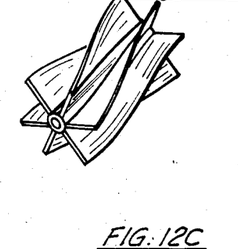
FIG. 12C shows the conveyor section formed by the mold of FIGS. 12A and 12B.

The FIGS. 8A and 8B through 12A and 12B represent end and side views respectively wherein there is more than one flight member enclosing each of the axial members 33 of the helical shaped device formed in the mold. As can be seen from the various figures, more than one helical shaped flight member 41 can be molded according to the teachings of this invention so long as all of the multiple flight members do not enclose more than 360 degrees, and none of the flight members on a single section overlap another flight member on the same section. Typically, and as an example only, if a resulting device formed by a mold similar to that shown in FIGS. 8A and 8B is to have two flight members 92 and 94 as shown in FIG. 8C then each flight member 92 and 94 will enclose approximately 180 degrees. Likewise for three flight members as shown in FIG. 9C and formed in molds similar to that shown in FIGS. 9A and 9B each flight member 96, 98 and 100 will enclose 120 degrees. However, as was discussed briefly, heretofore, the aperture extending into or through the axial member 33 may be of any desired non-circular shape. To better illustrate this feature, the device of FIG. 8C shows an ellipitical shaped aperture 93, and the device of FIG. 9C shows a hexagon shaped aperture 99.

In a similar manner, helical shaped devices having four, five and six flight members as formed by the molds shown in FIGS. 10A and 10B, 11A and 11B, and 12A and 12B would enclose no more than 90 degrees, 72 degrees, and 60 degrees respectively. As mentioned above, it is also necessary that none of the flight members enclosing the center axis 26 overlap one another. That is, each flight member is located in a rotational position around the axis 26 which is different from every other one of the flight members on the device. FIGS. 10C through 12C show screw conveyor sections produced by the molds 10A through 12A respectively.

Figure 13:
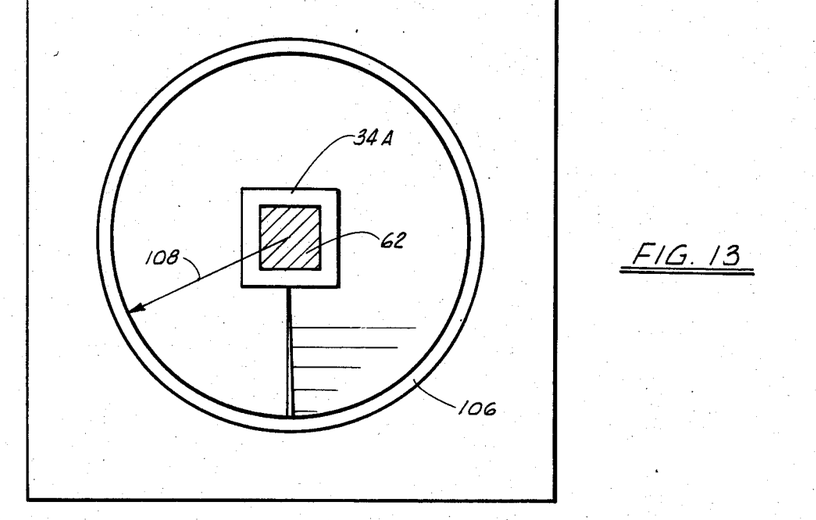
FIGS. 13 and 14 show a top and elevation view of the mold of FIG. 1 which further includes an annular cavity for forming a cylinder enclosing the flight members.
Figures 14, 15:
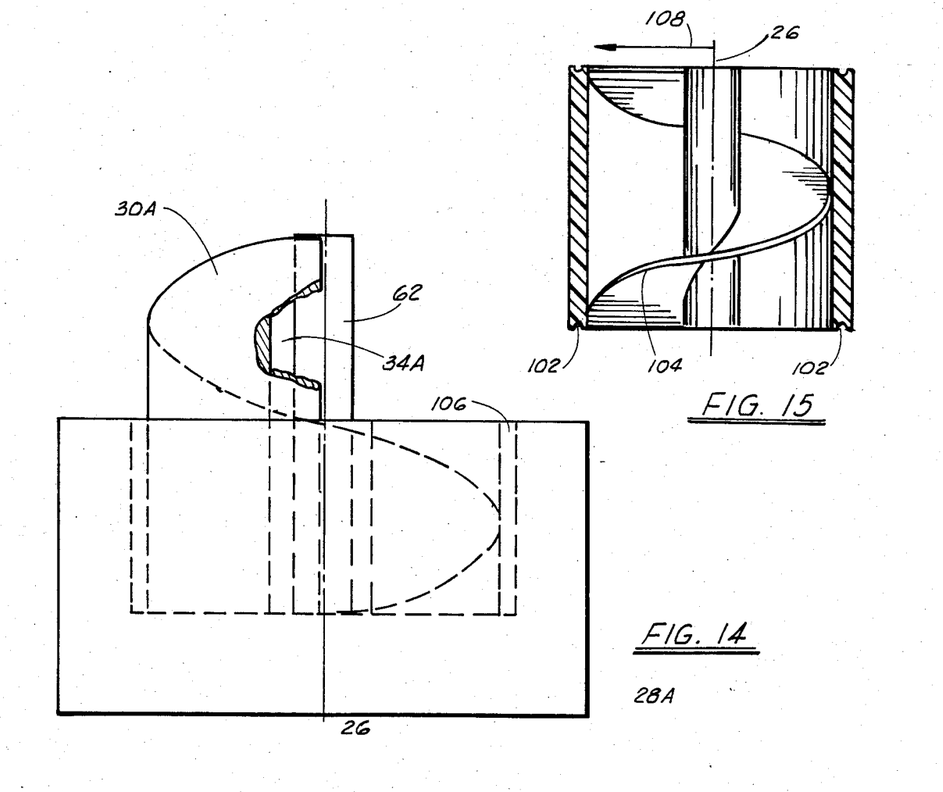
FIG. 15 shows a module or section of a screw conveyor formed by the mold of FIGS. 13 and 14.

FIGS. 13 and 14, show a mold similar to that of FIG. 1 wherein the resulting helical shaped device includes a cylindrical or sleeve member 102 which is molded integrally and joins with the helical shaped flight 104 such as is shown in FIG. 15. That is achieved by means of including in each of the mold sections an annular shaped cavity 106. The annular shaped cavity 106 is located coaxially with the center axis 26 and has an inside radius 108 which is equal to the radius of the flight members itself. Thus, the cylinder portion 102 is formed around and integrally with the helical shaped flight member 104. Of course, molds having exterior shapes substantially similar to those of FIGS. 3, 4, 5 and 6 may also be used to form the helical shaped sections of FIG. 15 by simply including an annular shaped cavity in the mold.

Figure 16:
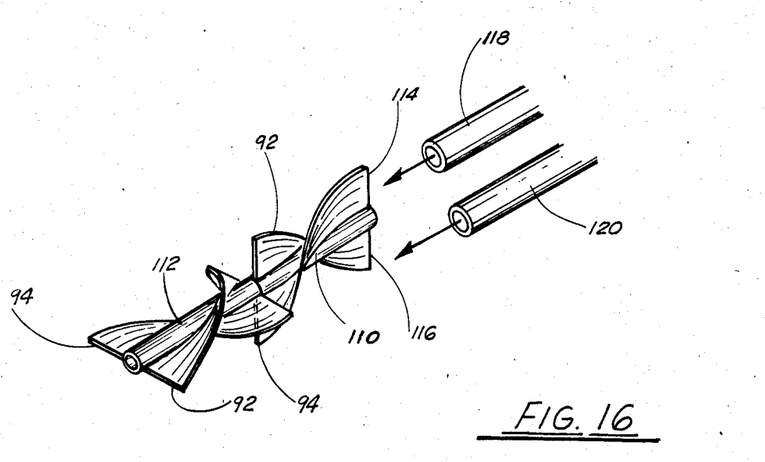
FIG. 16 illustrates how two sections of a device of this invention which has two flights such as shown in FIG. 8C may serve as a static mixer.

As shown in FIG. 16 two or more sections having two flights 92 and 94 such as shown in FIG. 8C may be joined axially such that the flights on one section 110 are rotated 90° to the flight on second section 112. Such an arrangement would provide equal static mixing four times of two materials ejected against the edge 114 and 116 of flights 92 and 94 from ejectors 118 and 120. Of course, a third section also connected axially to one of the other two sections would result in mixing of eight times. Each additional added section would double the amount of mixing. Of course, although not shown, even greater mixing of two, three or more types of materials may be achieved by using sections with more than two flights such as sections shown in FIGS. 9C through 12C.

Figure 17:
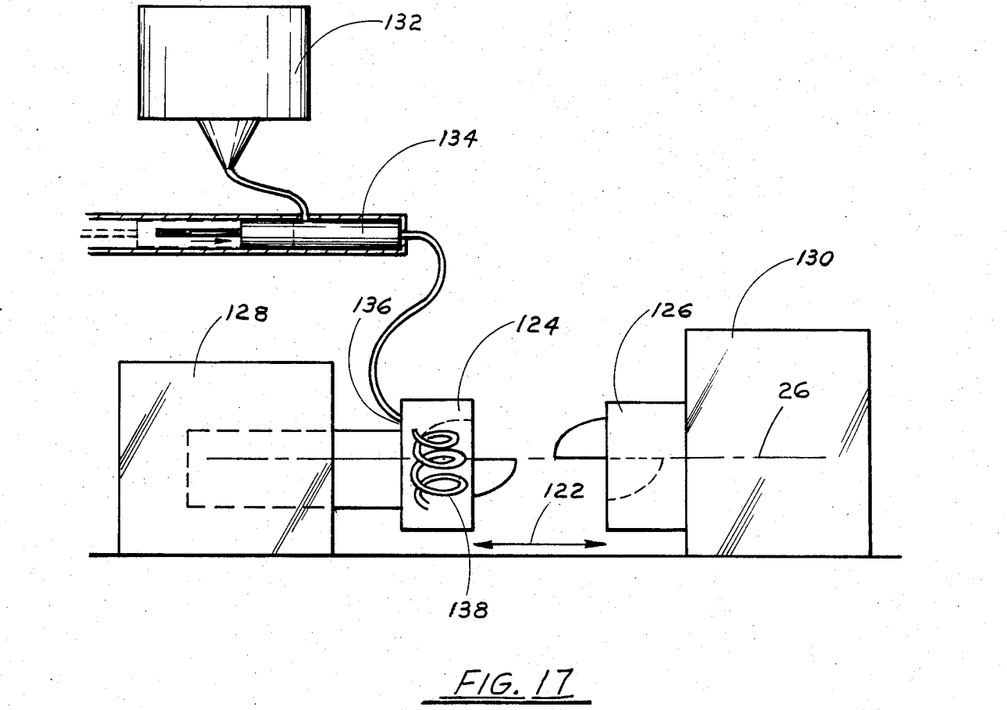
FIG. 17 discloses a block flow diagram showing the various processing steps of the preferred embodiment of this invention using a mold of this invention.

Referring now to FIG. 17, there is shown the processing steps for manufacturing a helical shaped device using the mold of this invention. As represented by double headed arrow 122, the mold halves 124 and 126 is supported by structures 128 and 130 so that the mold halves can be moved to the closed position along the center axis 26 such that the desired cavity is formed by the two halves as discussed heretofore. The selected material from which the resulting device is made is then injected from source 132 by means of piston 13 into the mold through port 136 to the interior of the cavity at a selected temperature and pressure to completely fill the cavity and form the resulting helical shaped device. It will be appreciated the mold may require additional cooling as indicated by coils 138, and that the temperature and pressures at which the selected material is injected into the mold may vary depending upon the material used. Further, although substantially any type of plastic or suitable curing material may be used, it is expected that a particularly preferable product may be obtained by using selected thermo setting materials such as various rubbers, polyethylene, polyurethane, polypropylene and the like. Once the material has been injected and completely fills the cavity, and the material has been allowed to cool and cure to a point where it will retain its desired shape, the two halves of the mold 124A and 124B are then opened with respect to each other along the center axis 26 and the resulting helical part ejected. It is of particular importance to understand with respect to this invention however, that no rotation of the mold halves is required, and that a simple movement along the center axis 26 is all that is necessary to open and close the mold.

It is also of importance to note that although the invention has been discussed with respect to injection molding of thermo setting materials such as plastic, the axial opening of this invention is equally applicable to molds suitable for receiving metal and forming metal helical shaped castings.

Further, as will be appreciated and has already been discussed briefly, by molding the resulting device such as shown in FIG. 7, so that front axial end 88 and rear axial end 90 each have a shape which may cooperate with a similar modular helical shaped device, any desired multiplicity of the modular helical shaped devices may be joined axially to produce a continuous helical shaped device such as a screw conveyor, or length which has one or more flight members each of which may enclose greater than 360 degrees. Alternately, a static mixer of a selected mixing capacity may be achieved by joining a selected member of sections end-to-end such that the flights of each section are rotationally offset from each adjoining section.

Thus, although there has been described to this point particular embodiments of the mold and process of molding helical shaped devices, it is not intended that such specific references be considered as limitations upon the scope of this invention, except insofar as set forth in the following claims.

I claim:

1. A reusable mold for forming, from a selected material, a helical shaped device enclosed in a cylinder which includes an axial member having a first and second end integrally joined with a helical shaped flight member extending a selected distance radially from a center line of said axial member and having front and back surfaces, said flight member further extending an axial distance substantially equal to the length of said axial member and up to 360 degrees coaxially around said axial member, said mold having a center axis and comprising:

a first section partially defining an elongated cavity portion extending along and around said center axis for forming a portion of said axial member, said first section further defining a helical surface extending an axial distance substantially equal to the length of said axial member, said helical surface being disposed coaxially around and along said center axis and extending said selected distance radially therefrom for a selected amount of rotation no greater than 360 degrees for forming one of said front and back surfaces of said helical shaped flight member;

a second section adapted for reciprocating movement along said center axis between an open and closed position with respect to said first section, said second section partially defining said elongated cavity portion extending along and around said center axis for forming another portion of said axial member, said second section further defining a helical surface extending an axial distance which is substantially equal to the length of said enlongated cavity portion and disposed coaxially around and along said center axis and extending said selected distance radially therefrom for said selected amount of rotation for forming the other one of said front and back surfaces of said helical shaped flight member;

said first and second sections cooperating such that when in said closed position, said helical surfaces of each section are substantially parallel to each other, and are maintained at a selected and constant spacing, so that said sections define an enclosed cavity having an elongated axial portion and a helical shaped flight portion, said helical shaped flight portion extending an axial distance which is substantially equal to said elongated axial portion and having a selected cross-section extending radially a selected distance from said center axis and coaxially therewith for said selected amount of rotation, said first and second section further defining an annular shaped aperture located coaxially with said center axis, and said annular aperture having an inside radius equal to said selected distance;

at least one of said first and second sections defining a passageway extending from said enclosed cavity to the outside of said mold such that said selected material may be transferred from outside of said mold to fill said cavity and integrally form said helical shaped flight member, said enclosing cylinder, and said axial member; and said mold sections further cooperating such that said helical shaped device formed in said cavity may be removed by moving said second section along said center axis to said open position without twisting.

2. The mold of claim 1 wherein said first section and said second sections are identical.

3. The mold of claim 1 and further including a central rod member positioned coaxially with said center axis and having a selected cross-section wherein said selected cross-section is smaller than the cross-section of said elongated cavity, and said central rod member extending at least a portion of the length of said elongated cavity such that when removed from said mold said axial shaped member defines an aperture extending into and coaxially therewith.

4. The mold of claim 3 wherein said central rod member extends the full length of said cavity and includes a first and second portion, wherein said first and second portion, meet at an intermediate point and are permanently connected one each to said first and second sections.

5. The mold of claim 3 wherein said central rod member is a single piece, connected to and extending from one of said first and second sections.

6. The mold of claim 3 wherein said central rod member is a single piece connected to and extending from one of said first and second sections the full length of said cavity.

7. The mold of claim 3 or 6 wherein said central rod member and said defined aperture extending into said axial member has a non-circular shape.

8. The mold of claim 7 wherein said non-circular shape is a square shape.

9. The mold of claim 1 or 3 wherein said elongated axial portion of said enclosed cavity defines a first axial end having a selected shape and a second axial end having substantially the same said selected shape such that a multiplicity of helical shaped devices formed by said mold and having cooperating axial ends may be joined axially one to another to produce an elongated helical shaped device of a selected length having a continuous helical flight member of greater than 360 degrees.

10. The mold of claim 9 wherein said enclosed cavity defines a selected shape for forming helical shaped devices such that axially joining a multiplicity of such devices form an elongated helical shaped screw conveyor of said selected length.

11. The mold of claim 1, or 5 wherein said surfaces of said first and second sections of said mold includes a selected number of at least two helical shaped surfaces on each section disposed along and coaxially around said center axis for a selected amount of rotation, said selected amount of rotation being no greater than the number of degrees determined by dividing said selected number of flight members into 360 degrees, and each of said selected number of surfaces being located in a rotational position different from every other one of said selected number of surfaces.

12. The mold of claim 11 wherein said elongated axial portion of said enclosed cavity defines a first axial end having a selected shape and a second axial end having substantially the same said selected shape such that a multiplicity of helical shaped devices formed by said mold having cooperating axial ends which may be joined axially one to another and so that the flights do not match for forming a static mixer.

13. The mold of claim 11 wherein said selected number of helical shaped surfaces numbers two surfaces, and each of said two surfaces encloses substantially 180 degrees of said center axis.

14. The mold of claim 11 wherein said selected number of helical shaped surfaces numbers three flight members, and each of said three surfaces encloses substantially 120 degrees of said center axis.

15. The mold of claim 11 wherein said selected number of helical shaped surfaces, numbers four surfaces, and each of said four surfaces enclose substantially 90 degrees of said center axis.

16. The mold of claim 11 wherein said selected number of helical shaped surfaces numbers five surfaces, and each of said five surfaces enclose substantially 72 degrees of said center axis.

17. The mold of claims 1, 2 or 5 wherein said helical surfaces of said first and second sections of said mold is a single helical shaped surface of substantially 360°.

18. The mold of claim 7 wherein said elongated axial portion of said cavity has a square cross-section such that said formed axial member has a square cross-section.

19. The mold of claim 11 wherein said selected number of helical shaped surfaces numbers six surfaces, and each of said six surfaces enclose substantially 60 degrees of said center axis.

20. The mold of claim 1 wherein the radial dimension of said helical surface extending between the elongated cavity and said selected radial distance is greater than the radial dimension of said elongated cavity extending from said center axis to said helical surface.

21. The mold of claims 1 or 20 wherein each one of said first and second mold sections includes supporting structure extending substantially beyond said radial distance and having a planar face for joining with the other one of said sections.

22. A method for producing a helical shaped device enclosed in a cylinder including an axial member having a first and second end integrally joined with a helical shaped flight member extending a selected radial distance from said axial member and having front and back surfaces, said flight member extending an axial distance which is substantially equal to the length of said axial member and up to 360 degrees coaxially around said axial member, said method comprising the steps of:

providing a reusable mold having first and second sections wherein each of said sections include a center axis, such that when said center axis of each of said first and second sections are coaxial with each other, said two sections are adapted for reciprocating movement with respect to each other between an open and closed position, along said center axis, each of said first and second sections partially defining an elongated cavity portion extending along and around a center axis for forming a portion of said axial member, and each section further defining a helical surface extending an axial distance which is substantially equal to the length of said elongated cavity portion, said helical surface being disposed coaxially around and along said center axis, and extending radially said selected distance therefrom for a selected amount of rotation no greater than 360 degrees, one each of said surfaces of said section for forming one each of said front and back surfaces of said helical shaped flight member, said first and second sections further defining an annular shaped aperture located coaxially with said center axis, and said annular aperture having an inside radius equal to said selected radial distance;

supporting said first and second sections such that said center axis of each section are parallel and in register;

moving at least one of said first and second sections with respect to the other section along said coaxially aligned center axis to said closed position without twisting such that said helical surfaces of each section are parallel to each other and are maintained at a selected and constant spacing so that said sections define an enclosed cavity having an elongated axial portion and a helical shaped flight portion extending an axial distance which is substantially equal to the length of said elongated axial portion, and a selected cross-section extending radially said selected distance therefrom and coaxially with said axial portion for said selected amount of rotation;

injecting an amount of selected material at a selected temperature and pressure into said enclosed cavity through a gate extending from a source outside of said cavity sufficent to fill said enclosed cavity;

subjecting said first and second section to a selected amount of force parallel to said aligned center axis to maintain said sections in said closed position during said injection of said selected material;

curing said injected material to form a helical shaped device conforming to said cavities;

moving at least one of said sections along said center axis to said open position without twisting; and removing said formed helical shaped device from said mold.

23. The method of claim 22 and further including the step of positioning a central rod having a selected cross-section smaller than the cross-section of said elongated cavity coaxially with and extending partway into said elongated cavity, such that said formed axial shaped member defines an aperture extending partway into and coaxially therewith.

24. The method of claim 22 and further including the step of positioning a rod member having a non-circular cross-section smaller than the cross-section of said elongated cavity coaxially with and extending the length of said elongated cavity such that said formed axial shaped member defines an aperture extending through and coaxially therewith.

25. The method of claim 22 or 24 and further including the step of defining an annular shaped aperture in each of said first and second section of said reusable mold, said annular shaped aperture being located coaxially with said center axis and having an inside and outside radius, said inside radius being equal to said selected distance such that a cylinder portion is formed around and molded to said helical shaped device.

26. The method of claim 23 and further including the step of axially joining a multiplicity of said helical shaped devices formed by said mold to produce an elongated helical shaped device of a selected length having a continuous helical flight member of greater than 360 degrees.

27. The method of claim 22 wherein the step of providing a reusable mold further comprises providing a mold wherein the cavity formed by said first and second sections define a first axial end having a selected shape and a second axial end having substantially the same said selected shape such that a multiplicity of helical shaped devices formed by said mold and having cooperating axial ends may be joined axially one to another to produce an elongated helical shaped device of a selected length having a continuous flight member of greater than 360 degrees.

28. The method of claim 22 wherein the step of injecting comprises injecting a material selected from the group consisting of thermosetting rubber, polyethylene, polypropylene and polyurethane.

29. The method of claim 22 wherein the step of providing a reusable mold further comprises providing a mold such that the radial dimension of said helical suface extending between the elongated cavity and said selected radial distance is greater than the radial dimension of said elongated cavity extending from said center axis to said helical surface.

30. A reusable mold for forming, from a selected material, a helical shaped device enclosed in a cylinder which includes an axial member integrally joined with a helical shaped flight member having front and back surfaces, said flight member extending a selected distance radially from said axial member and up to 360 degrees coaxially around said axial member, said mold having a center axis and comprising:

a first section partially defining an elongated cavity portion extending along and around said center axis for forming a portion of said axial member, said first section defining a helical surface disposed coaxially around and along said center axis and extending said selected distance radially therefrom for a selected amount of rotation no greater than 360 degree for forming one of said front and back surfaces of said helical shaped flight member, and further defining an annular shaped aperture located coaxially with said center axis and said annular aperture having an inside and outside radius, said inside radius equal to said selected distance such that a cylindrical cavity is formed around said helical surface;

a second section adapted for reciprocating movement along said center axis between an open and closed position with respect to said first section, said second section partially defining said elongated cavity portion extending along and around said center axis for forming another portion of said axial member, said second section defining a helical surface disposed coaxially around and along said center axis and extending said selected distance radially therefrom for said selected amount of rotation for forming the other one of said front and back surfaces of said helical shaped flight member, and further defining an annular shaped aperture located coaxially with said center axis and said annular aperture having an inside and outside radius, said inside radius equal to said selected distance such that a cylindrical cavity is formed around said helical surface;

said first and second sections cooperating such that when in said closed position, said helical surfaces of each section are parallel to each other, and are maintained at a selected and constant spacing, so that said sections define a substantially enclosed cavity having an elongated axial portion and a helical shaped flight portion of a selected cross-section extending radially a selected distance from said center axis and coaxially therewith for said selected amount of rotation, and an annular shaped enclosing cylinder;

at least one of said first and second sections defining a passageway extending from said enclosed cavity to the outside of said mold such that said selected material may be transferred from outside of said mold to fill said cavity and integrally form said helical shaped flight member, said enclosing cylinder and said axial member; and said mold sections further cooperating such that said helical shaped device formed in said cavity may be removed by moving said second section along said center axis to said open position.

31. The mold of claim 30 wherein said selected cross-section of said helical shaped flight portion of said cavity is substantially a rectangular cross-section in shape having a pair of long sides which converge toward each other from the axial member at a selected angle.

32. The mold of claim 30 wherein said enclosed cavity defines a first axial end of a selected shape and a second axial end of a second selected shape suitable for cooperating with each other such that a multiplicity of helical shaped devices formed by said mold may be joined axially one to another to produce an elongated helical shaped device of a selected length having a continuous helical flight member of greater than 360 degrees.

* * * * *